US010200624B2

(12) United States Patent
Cabral et al.

(10) Patent No.: US 10,200,624 B2
(45) Date of Patent: Feb. 5, 2019

(54) THREE-DIMENSIONAL, 360-DEGREE VIRTUAL REALITY EXPOSURE CONTROL

(71) Applicant: Facebook, Inc., Menlo Park, CA (US)

(72) Inventors: Brian Keith Cabral, San Jose, CA (US); Albert Parra Pozo, San Mateo, CA (US); Forrest Samuel Briggs, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 354 days.

(21) Appl. No.: 15/096,128

(22) Filed: Apr. 11, 2016

(65) Prior Publication Data

US 2017/0295309 A1 Oct. 12, 2017

Related U.S. Application Data

(60) Provisional application No. 62/318,843, filed on Apr. 6, 2016.

(51) Int. Cl.
*H04N 5/235* (2006.01)
*H04N 5/243* (2006.01)
(Continued)

(52) U.S. Cl.
CPC ......... *H04N 5/2352* (2013.01); *H04N 5/2351* (2013.01); *H04N 5/2353* (2013.01);
(Continued)

(58) Field of Classification Search
CPC . H04N 5/3415; H04N 5/2353; H04N 5/23238
(Continued)

(56) References Cited

U.S. PATENT DOCUMENTS 9,185,391 B1 11/2015 Prechtl
2005/0030392 A1 2/2005 Lee et al.
(Continued)

FOREIGN PATENT DOCUMENTS

JP 2010-074535 A 4/2010
JP 2010-283743 A 12/2010

OTHER PUBLICATIONS

European Patent Office, European Search Report and Opinion, European Patent Application No. 17160344.2, dated Jul. 7, 2017, eight pages.
PCT International Search Report and Written Opinion, PCT Application No. PCT/US2017/016524, dated Jun. 1, 2017, thirteen pages.

*Primary Examiner* — Xi Wang
(74) *Attorney, Agent, or Firm* — Fenwick & West LLP

(57) ABSTRACT

A camera system is configured to capture, via a plurality of cameras, 360 degree image information of a local area, at least a portion of which is in stereo. The camera system determines respective exposure settings for the plurality of cameras. A minimum shutter speed and a maximum shutter speed are determined from the determined exposure settings. A set of test exposure settings is determined using the determined minimum shutter speed and maximum shutter speed. A set of test images is captured using the plurality of cameras at each test exposure setting in the set of test exposure settings. Each set of test images includes images from each of the plurality of cameras that are captured using a same respective test exposure setting. A global exposure setting is selected based on the captured sets of test images. The selected global exposure setting is applied to the plurality of cameras.

20 Claims, 10 Drawing Sheets

(51) Int. Cl.
 *H04N 5/232* (2006.01)
 *H04N 13/204* (2018.01)
 *H04N 13/243* (2018.01)
 *H04N 13/296* (2018.01)
(52) U.S. Cl.
 CPC ..... *H04N 5/23216* (2013.01); *H04N 5/23238* (2013.01); *H04N 5/243* (2013.01); *H04N 13/204* (2018.05); *H04N 13/243* (2018.05); *H04N 13/296* (2018.05)
(58) Field of Classification Search
 USPC ...... 348/143, 362, 297; 396/63–70, 213–262
 See application file for complete search history.

(56) References Cited

U.S. PATENT DOCUMENTS

| | | | |
|---|---|---|---|
| 2007/0097212 A1* | 5/2007 | Farneman | H04N 5/77 348/143 |
| 2011/0164108 A1 | 7/2011 | Bates et al. | |
| 2012/0105574 A1 | 5/2012 | Baker et al. | |
| 2014/0232895 A1 | 8/2014 | Schieltz | |
| 2014/0362176 A1 | 12/2014 | St. Clair et al. | |
| 2015/0116453 A1* | 4/2015 | Hirata | H04N 5/23245 348/38 |
| 2015/0145952 A1* | 5/2015 | Hirata | H04N 5/23206 348/38 |
| 2015/0348580 A1* | 12/2015 | van Hoff | G11B 19/20 348/38 |

* cited by examiner

THREE-DIMENSIONAL, 360-DEGREE VIRTUAL REALITY EXPOSURE CONTROL

CROSS-REFERENCE TO RELATED APPLICATIONS

This application claims the benefit of prior U.S. Provisional Patent Application No. 62/318,843, filed Apr. 6, 2016, the disclosure of which is hereby incorporated by reference in its entirety.

BACKGROUND

The disclosure relates generally to camera imaging, and more specifically to exposure control of a three-dimensional (3D), 360-degree camera system.

Virtual reality systems capture images and/or video of an environment with one or more cameras. The images and/or video captured by the cameras are reconstructed to create a virtual reality that a user can interact with. The configuration of the one or more cameras impacts the quality of the images captured and the ability to reconstruct the images for a seamless virtual reality experience. Hence, the configuration of the cameras and lower quality captured images can adversely affect a user's virtual reality experience.

Conventional 360 degree cameras operate by stitching a plurality of frames together into a single 360 degree frame. Each frame may be subject to different lighting conditions which can result in different exposure settings (e.g., aperture, shutter speed, film speed, gain, etc.) for one or more of the frames. The differences in exposure settings may result in an inferior 360-degree image generated using the frames having different exposure settings. For example, brightness of the 360-degree image may vary between portions associated with different frames, differences in shutter speed may cause moving objects to blur in some portions of the image, differences in aperture may cause depth of field to vary in the 360-degree image, and differences in gain may cause some portions of the 360-degree image to have excessive noise.

SUMMARY

A camera system is configured to capture, via a plurality of cameras, image information (e.g., image, video, etc.) across 360 degrees of a local area, at least a portion of which is in stereo. The camera assembly sends the image information to a processing server, which generates 3D-360 degree content of the local area from the image information. The 3D-360 degree content is media content associated with a 360-degree field of view of the camera assembly and which may be rendered in 3D, e.g., an image, a video, audio information, or some combination thereof.

To facilitate generation of high quality, natural looking 3D-360 degree content, the camera system uses a global exposure setting and a global shutter setting. For example, in some embodiments, the camera system triggers the plurality of cameras using a global shutter such that each camera captures image information at a same time. The camera system also applies a global exposure setting to each of plurality of cameras. A global exposure setting is a single exposure setting that is applied to all of the cameras in the camera system. The global shutter setting facilitates generation of natural looking 3D-360 degree content.

The camera system determines a global exposure setting using test images captured by the plurality of cameras. The camera system determines respective exposure settings for the plurality of cameras each having a respective field of view of a portion of a local area, and a combined field of view spans 360 degrees of the local area. As each of the cameras has a different field of view, it may have an exposure setting different than other cameras in the plurality of cameras. A minimum shutter speed and a maximum shutter speed are determined from the determined exposure settings. A set of test exposure settings are determined using the determined minimum shutter speed and maximum shutter speed. The camera system determines a set of test exposure settings using the determined minimum shutter speed and maximum shutter speed. The camera system captures a set of test images using the plurality of cameras at each test exposure setting in the set. Each set of test images includes images from each of the plurality of cameras that are captured using a same respective test exposure setting. The global exposure setting is selected based on the captured groups of test images. The selected global exposure setting is applied to the plurality of cameras.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
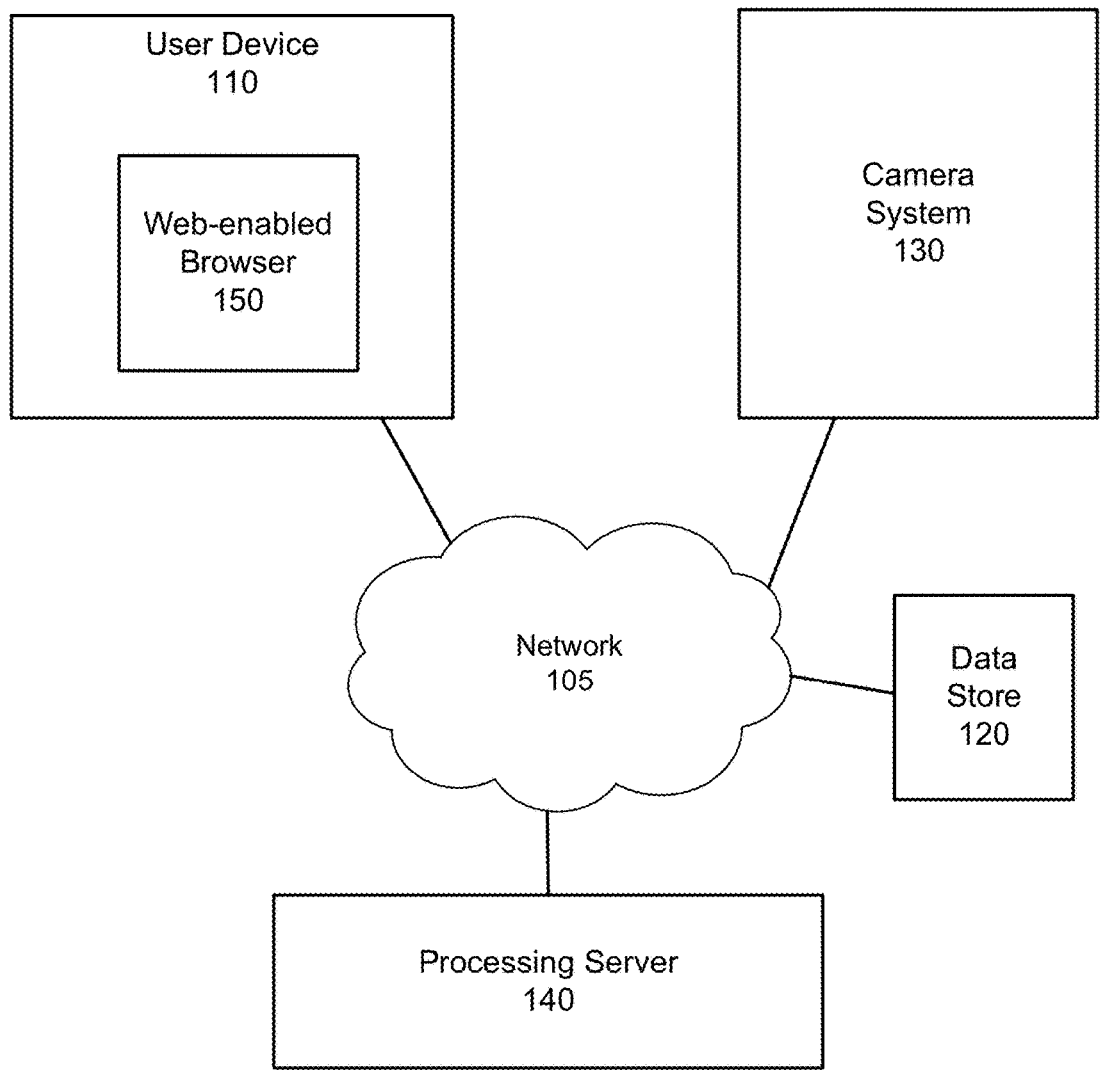
FIG. 1 is a high-level block diagram illustrating an embodiment of a system for generating 3D-360 degree content for a virtual reality system, according to an embodiment.

FIG. 1 is a high-level block diagram illustrating an embodiment of a system 100 for generating 3D-360 degree content for a virtual reality system, according to an embodiment. The system 100 includes a network 105 that connects a user device 110 to a data store 120, a camera system 130, and a processing server 140. In the embodiment of FIG. 1, only one user device 110 is illustrated, but there may be multiple instances of this entity. For example, there may multiple user devices 110 coupled, via the network 105, to the data store 120, the camera system 130, and the processing server 140.

The network 105 provides a communication infrastructure between the user devices 110, the data store 120, the camera system 130, and the processing server 140. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

The user device 110 is a computing device that executes computer program modules—e.g., a web-enabled browser 150 or some other client application—which allow a user to view a user interface for the camera system 130. A user device 110 might be, for example, a personal computer, a tablet computer, a smart phone, a laptop computer, or other type of network-capable device.

The data store 120 stores image information from the camera system 130 and the processing server 140. In some embodiments, the data store 120 can be cloud-based and is accessed by the camera system 130 and the processing server 140 via the network 105. The data store 120 may receive and store image information directly from the camera system 130, or the data store 120 may receive and store image information from the processing server 140 after the image information has been processed. In one embodiment, the data store 120 is a part of the processing server 140. In another embodiment, the data store 120 is an archive maintained by a third-party storage provider.

The camera system 130 generates image information using captured images and/or audio information of a local area surrounding the camera system 130. The camera system 130 comprises an assembly of cameras positioned to capture a 360 degree view of the local area. In the embodiment of FIG. 1, the assembly includes a plurality of cameras mounted to a rigid surface or structure. At least a portion of the plurality of cameras are arranged such that adjacent cameras may produce stereo images of the local area. Embodiments of the camera system 130 are discussed in detail below with regard to FIGS. 2A, 2B, 2C, and 3.

The local area is the environment that surrounds the camera system 130. For example, the local area may be a room that the camera system 130 is inside, or the camera system 130 may be outside and the local area is an outside area that is visible to the camera system 130. Image information is information output by the camera system 130. Image information may include, e.g., one or more images, audio information (e.g., sounds captured by one or more microphones), video information, metadata, or some combination thereof. Metadata is additional information associated with the image information. Metadata may include, e.g., frame rate, exposure setting (e.g., aperture, shutter speed, gain, etc.), copyright information, date/time information, camera identifier, names, labeling, some other information associated with the image information, or some combination thereof. The camera system 130 includes memory storage that buffers and stores the image information. In some embodiments, the camera system 130 may be locally coupled to (e.g., via some wired and/or wireless connection) an external data store. In some embodiments, the camera system 130 is configured to send the image information to the processing server 140 via the network 105. In alternate embodiments, the camera system 130 is configured to process the image information to form 3D-360 degree content at a high resolution. For example, 3D-360 degree content video content may be at, e.g., 4K, 6K, 8K resolution, or some other resolution supported by the camera system 130.

The camera system 130 receives instructions from a user to capture image information of the local area. For example, the camera system 130 can include a web server that allows users to control the camera system 130 using, e.g., the web-enabled browser 150 on the user device 110 via the network 105. The camera system 130 determines a global exposure setting (e.g., gain, shutter speed, aperture) using information from one or more cameras in the camera assembly 130, and applies the global exposure setting to all of the cameras in the camera system 130. Accordingly, each camera, regardless of a light metering specific to that camera, uses the global exposure setting. The camera system 130 synchronizes the capture of the image information using a global shutter that causes all of the cameras in the camera system 130 to take an exposure (using the global exposure setting) at the same time (e.g., using a global shutter). Accordingly, both exposure and time a frame is taken is consistent across all of the image information. The process for determining the global exposure setting for the camera system 130 is further explained in detail below with regard to FIGS. 4-6.

The processing server 140 generates 3D-360 degree content using image information. 3D-360 degree content is media content associated with a 360-degree field of view of the camera system 130 and at least a portion of which includes depth information and may be rendered in three dimensions (3D). 3D-360 degree content may include, e.g., an image, a video, audio information, or some combination thereof. The processing server 140 may generate the 3D-360 degree content in high resolution. For example, 3D-360 degree content video content may be at, e.g., 4K, 6K, 8K resolution, or some other resolution supported by the camera system 130. For example, 3D-360 degree content may be a video of the local area, the video being a merged representation of the images taken by the camera system 130, and which renders in 3D portions of the video corresponding to images taken by the peripheral cameras.

The processing server 140 receives the image information from the camera system 130, the data store 120, or some combination thereof. The processing server 140 is configured to create 3D-360 degree content with an algorithm performed by a set of computer-implemented instructions. The algorithm identifies a set of images in the image information associated with a same time value (e.g., metadata indicates captured at the same time), and merges the images into a single frame of 3D-360 degree content. Additionally, the processing server 140 may generate video files by coupling together multiple frames of 3D-360 degree content associated with different times. The 3D-360 degree content is output by the processing server 140 and can be stored in the data store 120 for access at a later time.

The system 100 beneficially allows a user to capture image information of a local area and construct 3D-360 degree content of the local area that may be used in, e.g., a virtual reality (VR) environment, or some other environment (e.g., augmented reality and/or mixed reality). The system 100 has a rigid structure, a synchronous operation, and a web-based interface. The rigidity of the camera system 130 prevents the plurality of cameras from moving with respect to each other once each camera has been aligned and calibrated, making it easier to process the image information and fuse the images together to construct the 3D-360 degree content. The synchronicity of the plurality of cameras allows for global setting to be applied to each camera and improves the quality of the image information captured, which, in turn, improves the quality of the 3D-360 degree content that is constructed. The web-based interface provides ease-of-use for a user to set up the system 100, preview captured image information, apply global setting, process image information, and access, use, or store 3D-360 degree content.

Figure 2A:
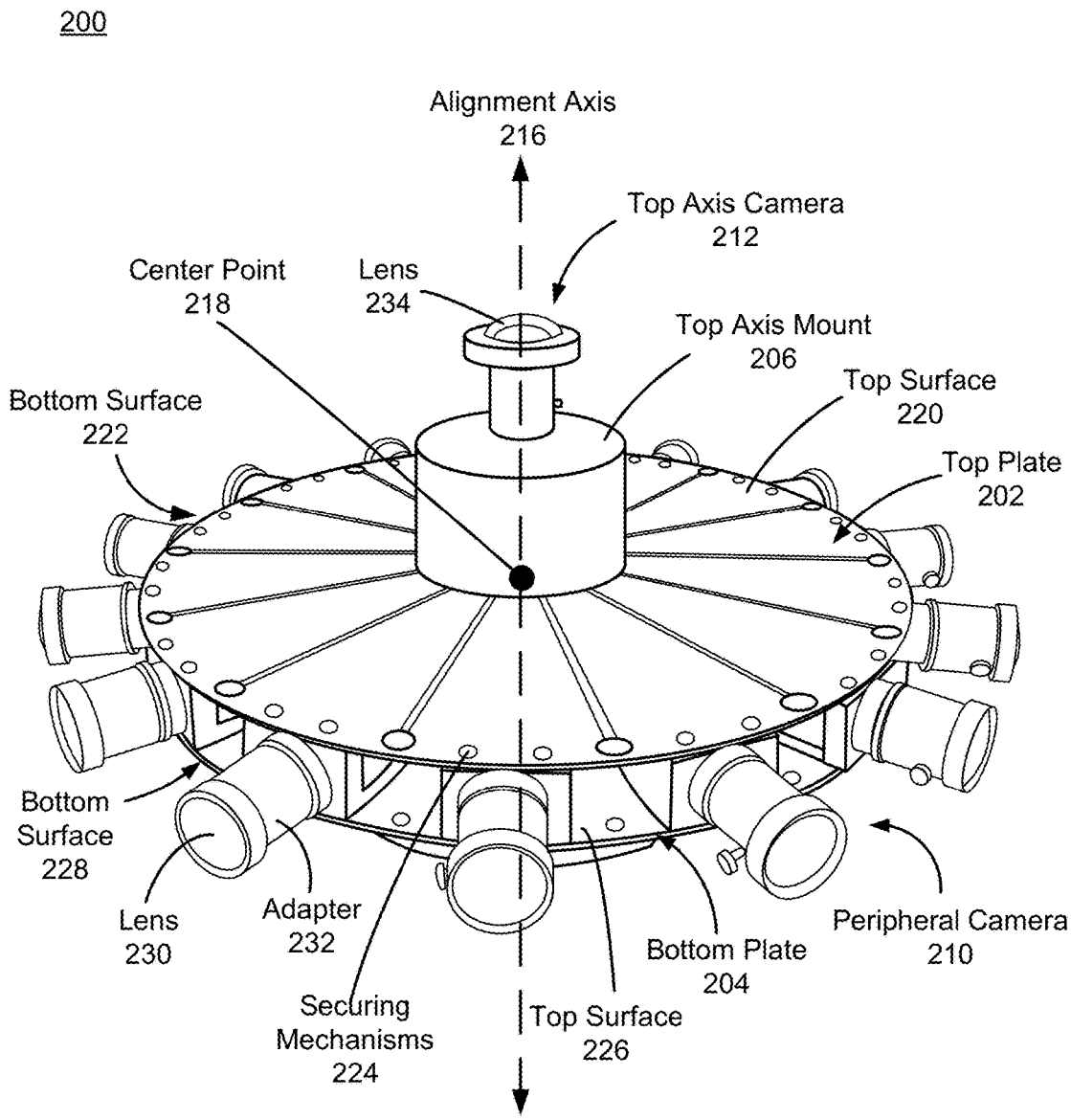
FIG. 2A illustrates a perspective view of a camera assembly for capturing image information, according to an embodiment.

FIG. 2A illustrates a perspective view of a camera assembly 200 for capturing image information, according to an embodiment. In some embodiments, the camera assembly 200 is an embodiment of the camera assembly 130 in system 100. Alternatively, the camera assembly 200 may be part of some other system. Some embodiments of the camera assembly 200 have different components than those described here. Similarly, in some cases, functions can be distributed among the components in a different manner than is described here.

As described in greater detail below, the camera assembly 200 generates image information using captured images and/or audio information of a local area. The camera assembly 200 includes a top plate 202, a bottom plate 204, a top axis mount 206, a bottom axis mount 208 (shown in FIG. 2C), a plurality of peripheral cameras 210, and a plurality of axis cameras including a top axis camera 212 and a bottom axis camera 214 (shown in FIG. 2C). The top plate 202, the bottom plate 204, the top axis mount 206, the bottom axis mount 208 (shown in FIG. 2C), the top axis camera 212, and the bottom axis camera 214 (shown in FIG. 2C) are aligned along an alignment axis 216. The plurality of peripheral cameras 210 are arranged such that they form a ring around a center point 218 that is bisected by the alignment axis 216. The top plate 202 couples to a top surface of the ring of peripheral cameras 210, and the bottom plate 204 couples to a bottom surface of the ring of peripheral cameras 210. This configuration creates a rigid structure that prevents vibration and overheating of the peripheral cameras 210 and allows the peripheral cameras 210 to capture quality images and/or video that are used to generate the portion of 3D content in the 3D-360 degree content.

The top plate 202 is configured to secure the plurality of peripheral cameras 210 and one or more axis cameras (e.g., top axis camera 212). The top plate 202 includes a top surface 220, a bottom surface 222, and a plurality of securing mechanisms 224. The top plate 202 is composed of a rigid material and is substantially disk-shaped. The rigid material may be, e.g., a metal (e.g., aluminum, steel, etc.), a rigid plastic, some other rigid material, or some combination thereof. The top surface 220 couples a top axis mount 206 to the top plate 202, such that the top axis mount 206 is centered along the alignment axis 216. Along the periphery of the top plate 202 are the plurality of securing mechanisms 224. Each securing mechanism 224 is configured to secure a peripheral camera 210 to the bottom surface 222 of the top plate 202. For example, the securing mechanisms 224 may be mechanical fasteners (e.g. screws, bolts) that couple the top plate 202 to the plurality of peripheral cameras 210.

The bottom plate 204 is configured to secure the plurality of peripheral cameras 210 and one or more axis cameras (e.g. bottom axis camera 214) and is substantially similar to the top plate 202. The bottom axis camera 214 is not shown in FIG. 2A but is illustrated as axis camera 214 in FIG. 2C. The bottom plate 204 includes a top surface 226, a bottom surface 228, and a plurality of securing mechanisms 224. The bottom plate 204 is composed of a rigid material and is substantially disk-shaped. The rigid material may be, e.g., a metal (e.g., aluminum, steel, etc.), a rigid plastic, some other rigid material, or some combination thereof. The bottom surface 228 is configured to couple a bottom axis mount 208 (not shown in FIG. 2A) to the bottom plate 204, such that a bottom axis mount 208 is centered along the alignment axis 216. Along the periphery of the bottom plate 204 are an additional plurality of securing mechanisms 224, wherein each securing mechanism 224 secures a peripheral camera 210 to the top surface 226 of the bottom plate 204. The bottom surface 228 is further configured to couple to a support structure that provides standing or mounting support and stability for the camera system 130. The support structure can be a variety of mounts (e.g. monopod, tripod, quadrantpod, wall mount, etc.).

The axis mounts are configured to secure an axis camera (e.g. top axis camera 212 or bottom axis camera 214) perpendicular to a surface of the top plate 202 or the bottom plate 204. The axis mounts are substantially cylindrical and hollow within. This configuration allows an axis camera to be vertically offset from the surface of the top plate 202 or the bottom plate 204, allowing for less overlap of the field of views of the axis cameras 212, 214 and the peripheral cameras 210. Wires connecting to the axis cameras may be hidden within the hollow portion of the axis mounts. In the embodiment of FIG. 2A, the top axis mount 206 is coupled to the top surface 220 of the top plate 202, and the bottom axis mount 208 is coupled to the bottom surface 214 of the bottom plate 210. Each axis mount is aligned along the alignment axis 216 and provides stability for an axis camera.

The peripheral cameras 210 are configured to capture images and/or video of a 360 degree view of the local area. The peripheral cameras 210 are positioned such that they form a ring around the center point 218 that is bisected by the alignment axis 216. The plurality of peripheral cameras 210 are positioned around the center point 218 such that an optical axis of each peripheral camera 210 is within a plane, and a field of view of each peripheral camera 210 faces away from the center point 218. Each peripheral camera 210 is positioned next to the adjacent peripheral camera 210 at a certain distance and at certain angle. This configuration allows the captured images and/or video, once processed into 3D-360 content to include stereoscopic (also referred to as stereo) portions. In some embodiments, the distance simulates an inter-pupillary distance between the human eyes. The simulated inter-pupillary distance is dependent on the amount of overlap between horizontal fields of view of adjacent peripheral cameras 210. The amount of overlap is a function of the horizontal field of view of each peripheral camera 210 after correcting for barrel distortion and of the angular spacing or number of peripheral cameras 210 in the ring configuration. For example, an embodiment that simulates greater than 6.4 cm inter-pupillary distance (which is approximately the median value for inter-pupillary distance of humans) consists of fourteen peripheral cameras evenly spaced, each with horizontal field of view greater than or equal to 77 degrees after correcting for barrel distortion. This configuration allows the captured images and/or video to simulate a human's perception of vision. The number of peripheral cameras 210 may vary and can depend on the size of the top plate 202 and the bottom plate 204, and/or a field of view of each of the peripheral cameras 210. In the embodiment of FIG. 2A, there are fourteen peripheral cameras 210 which form the ring and capture a 360 degree view of the environment. In other embodiments, there may be more or less peripheral cameras 210.

A peripheral camera 210 includes a sensor (not shown), a lens 230, and a camera controller (not shown). The sensor is an electrical device that captures light using an array of photo-sensitive pixels, wherein each pixel converts light into an electronic signal. Sensors can have varying features, such as resolution, pixel size and sensitivity, light sensitivity, type of shutter, and type of signal processing. The lens 230 is one or more optical elements of a camera that facilitate focusing light on to the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the peripheral camera 210 may have a microphone to capture audio information. The microphone can be located within the camera or may located external to the camera.

The camera controller is able to determine exposure setting (e.g. aperture, gain, and shutter) for the camera based on light incident on the sensor. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the peripheral cameras 210 act as ancillary cameras, the shutter and exposure setting are set globally by a principal camera. In the embodiment of FIG. 2A, the peripheral camera 210 includes several properties, such as a small form factor, high resolution (e.g., 2048×2048), a high frame rate (e.g., 90 frames per second), a 1" sensor, and a C-mount for a lens The field of view (FOV) of each axis camera can range between 120-185 degrees. In alternate embodiments, the FOV of the axis cameras could also be less than 120 or greater than 185. At minimum, it must be large enough to cover the holes left by the peripheral cameras 210. For example if a peripheral camera 210 has vertical FOV x degrees, in order to image the holes in coverage, the axis cameras should have a FOV of 2*(90−x) degree. In some embodiments, a larger FOV may be used to ensure sufficient overlap to enable a smooth transition in the 3D-360 degree content from a portion corresponding to image information from the axis cameras to a portion corresponding to image information from the peripheral cameras 210.

In the embodiment of FIG. 2A, the lens 230 has an optical coating that blocks infrared light, an f/2.4 aperture, a CS-mount for a camera, and a horizontal and vertical field of view of 92 degrees. The effective field of view of the lens 230 is 77 degrees after correction for barrel distortion. In other embodiments, each of the peripheral cameras 210 may have a different field of view. For example, each of the peripheral cameras 210 may have a 180 degree field of view (i.e., a fish eye lens). Extremely wide fields (i.e., fish eye) of views have the potential to reduce the number of peripheral cameras used to generate stereoscopic portions of the 3D-360 degree content, however, processing of the image information becomes more difficult as the image information tends to include larger amounts of distortion.

An adapter 232 allows for the use of off-the-shelf components in the camera assembly 200. The adapter 232 is configured to couple the peripheral camera 210 to the lens 230 by securing to the C-mount of the peripheral camera 210 at a first end and securing to the CS-mount of the lens 230 at a second end.

Each peripheral camera 210 further includes a plurality of securing mechanisms to secure the peripheral camera 210 between the top plate 202 and the bottom plate 204. The securing mechanisms are reciprocal to the securing mechanisms 224, allowing the peripheral camera 210 to couple to the bottom surface 222 of the top plate 202 and to couple to the top surface 220 of the bottom plate 204. In the embodiment of FIG. 2A, each of the peripheral cameras 210 is positioned such that the lens 230 points radially outward from the center point 218. The peripheral cameras 210 may be battery-powered, powered via cables and a cable interface (e.g. a universal serial bus (USB) interface), or some combination thereof. Additionally, some embodiments may have support structures mounted between the top plate 202 and the bottom plate 204 to increase rigidity and stability of the camera assembly 200. The support structures may be posts, support blocks, or some combination thereof.

The plurality of axis cameras are configured to capture images and/or video of top and bottom views of the local area. The axis cameras include a top axis camera 212 and a bottom axis camera 214 (shown in FIG. 2C) that are secured to their respective axis mounts 206, 208 and positioned such that both the top axis camera 212 and the bottom axis camera 214 are aligned along the alignment axis 216 such that an optical axis of each axis camera 212, 214 is collinear with the alignment axis 216. The field of view of the top axis camera 212 and the field of view of the bottom axis camera 214 are directed away from the center point 218 of the camera assembly 200.

Figure 2B:
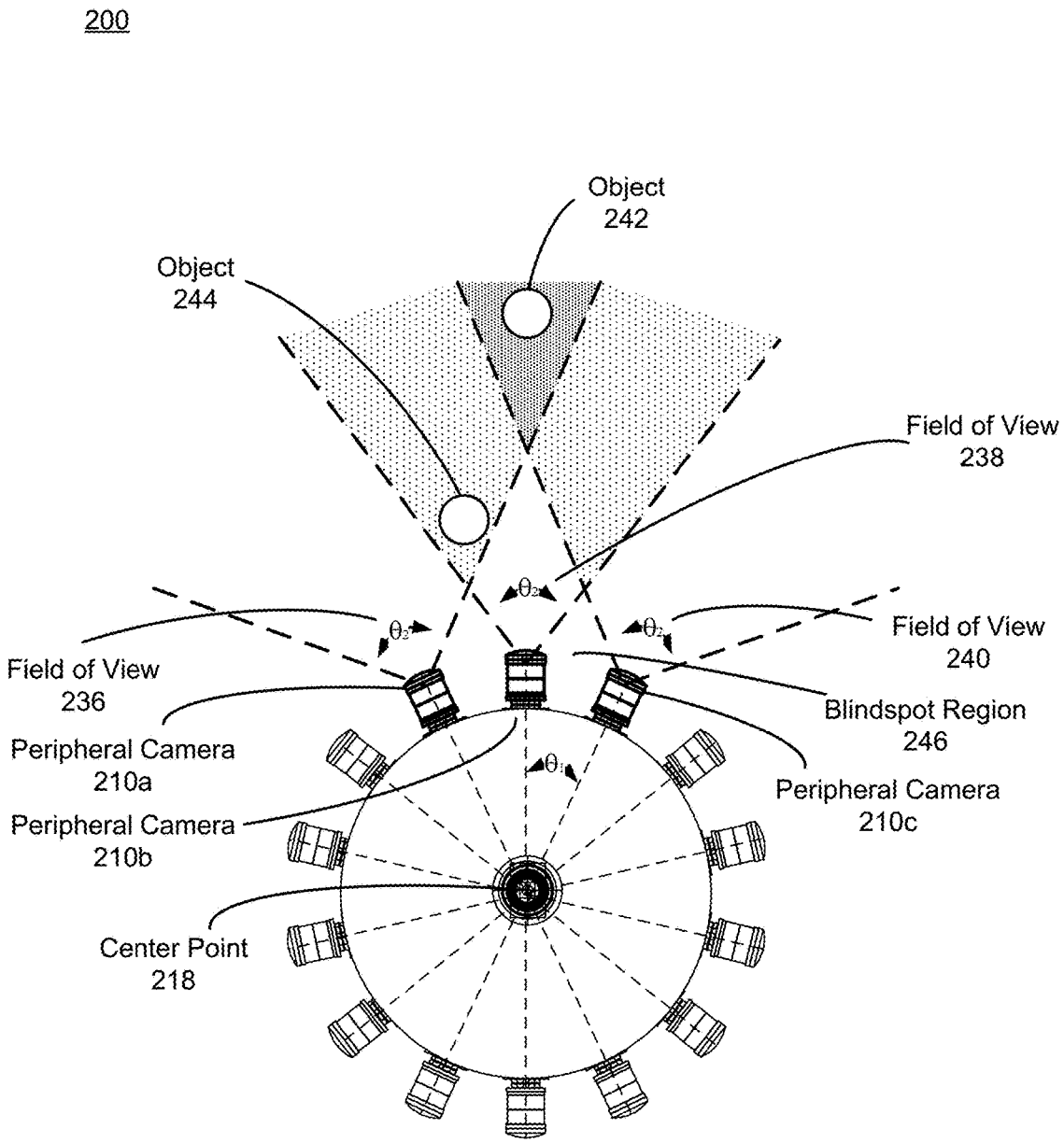
FIG. 2B illustrates a top-down view of the camera assembly shown in FIG. 2, according to an embodiment.
Figure 2C:
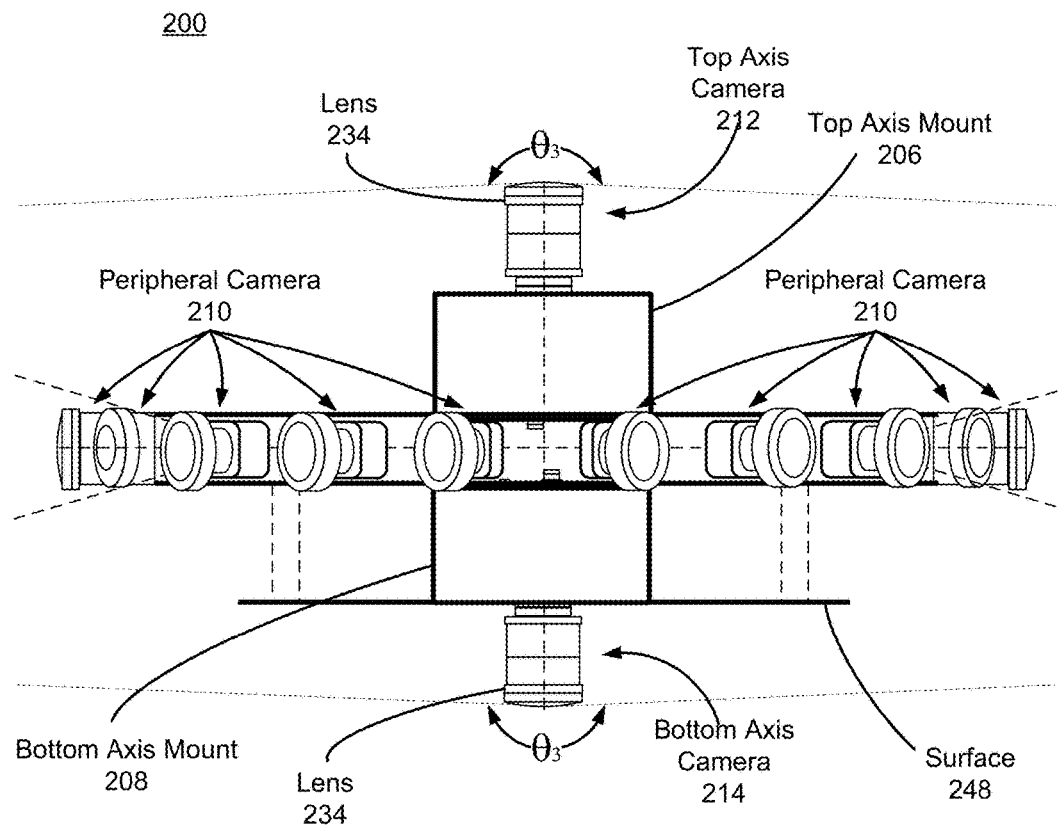
FIG. 2C illustrates a side view of the camera assembly shown in FIG. 2, according to an embodiment.

The top axis camera 212 provides a top view of a portion of the local area, while a bottom axis camera 214 (as illustrated in FIG. 2C) provides a bottom view of a different portion of the local area. As previously described, the top and bottom axis cameras 212, 214 are vertically offset relative to the peripheral cameras 210 to limit the overlap between the fields of view. The number and orientation of axis cameras may vary. In the embodiment of FIG. 2A, there are two axis cameras which capture a top and bottom view of the local area. In alternate embodiments (e.g., as discussed in relation to FIG. 2D), the camera assembly 200 includes two bottom axis cameras, which are arranged such that the field of view of the first bottom axis camera and the field of view of the second bottom axis camera have sufficient overlap to remove the mount that supports the camera assembly 200 as an occlusion in the 3D-360 degree content. In other embodiments, the top plate 202 and the bottom plate 204 may each secure a plurality of axis cameras, such that the arrangement of the axis cameras covers a hemisphere and provides a spherical field of view.

An axis camera includes a sensor (not shown), a lens 234, and a camera controller (not shown). The sensor is an electrical device that captures light using an array of photosensitive pixels, wherein each pixel converts light into an electronic signal. Sensors can have varying features, such as resolution, pixel size and sensitivity, light sensitivity, type of shutter, and type of signal processing. The lens 234 includes one or more optical elements of a camera that facilitates focusing light on the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the axis cameras may have a microphone to capture audio information. The microphone can be located within the camera or may be located external to the camera.

The camera controller is able to determine exposure setting (e.g. aperture, gain, and shutter) for the camera and controls the frame rate. In some embodiments, the camera controller acts as a principal camera, i.e. the camera controller controls a plurality of other cameras. In other embodiments, the camera controller acts as an ancillary camera, i.e.

the camera controller is controlled by a second camera. The embodiments in which the axis cameras act as ancillary cameras, the shutter and exposure settings are set globally by a principal camera. In the embodiment of FIG. 2A, the axis cameras include several properties, such as a small form factor, high resolution (e.g. 2048×2048), a high frame rate (e.g., 90 frames per second), a 1" sensor, and a C-mount for a lens. The field of view of each axis camera can range between 120-185 degrees. In alternate embodiments, the FOV of the axis cameras could also be less than 120 or greater than 185. At minimum it must be large enough to cover the holes left by the peripheral cameras 210. For example if a peripheral camera 210 has vertical FOV x degrees, in order to image the holes in coverage, the axis cameras should have a FOV of 2*(90−x) degree. In some embodiments, a larger FOV may be used to ensure sufficient overlap to enable a smooth transition in the 3D-360 content from a portion corresponding to image information from the axis cameras to a portion corresponding to image information from the peripheral cameras 210.

In the embodiment of FIG. 2A, a lens 234 has an optical coating that blocks infrared light, a f/1.8-16 aperture, a C-mount for a camera, and a horizontal and vertical field of view of 185 degrees. The axis cameras may be battery-powered, powered via cables and a cable interface (e.g. a USB interface), or some combination thereof.

The camera assembly 200 captures image information using the plurality of peripheral cameras 210 and axis cameras that are positioned to view 360 degrees of a local area. The settings of the camera assembly 200 can be previewed and modified remotely by a user. The image information can be sent to the data store 120 or to the processing server 140 to generate 3D-360 degree content.

FIG. 2B illustrates a top-down view of the camera assembly 200 shown in FIG. 2, according to an embodiment. FIG. 2B demonstrates the configuration of the peripheral cameras 210 and highlights a field of view 236, field of view 238, and a field of view 240, as seen by three peripheral cameras 210a, 210b, and 210c, respectively. An object 242 and an object 244 in the local area are viewed by the peripheral cameras 210a, 210b, and 210c. The illustration in FIG. 2B is used for reference and may not be illustrated to scale.

As described with regards to FIG. 2A, the peripheral cameras 210 are arranged such that they create a ring around the center point 218, with the lens 230 pointing outwards from the center point 218 bisected by the alignment axis 216. Each peripheral camera 210 is separated from any adjacent peripheral camera 210 by a spacing distance. The spacing distance is the distance between sensors of adjacent peripheral cameras 210. In some embodiments, the spacing distance is approximately the same as an inter-pupillary distance of human eyes. This configuration allows the captured images and/or video to simulate how a human would perceive the imaged portions of the local area.

The peripheral cameras 210 are positioned in a ring configuration; accordingly, each camera is at a slight angle, $\theta_1$, relative to adjacent cameras. For example, in some embodiments, the angle $\theta_1$ is 25.71 degrees, which allows for significant overlap between the fields of view of the peripheral cameras 210. The angle, $f_1$, and the field of views of each peripheral camera 210 are configured such that an object in the local area imaged by the peripheral cameras 210 can be seen by at least two peripheral cameras 210. As illustrated in FIG. 2B, the fields of view 236, 238, 240 for the peripheral cameras 210a, 210b, 210c, respectively, begin to overlap at a threshold distance; the overlapping fields of view are represented by the shaded regions. In the embodiment of FIG. 2B, each peripheral camera 210 has a field of view of $\theta_2$, which is 77 degrees. The regions between the fields of view 236, 238, 240 are a blindspot region 246 in which the objects are not viewed by any peripheral camera 210.

The threshold distance is the distance at which objects in the local area can be viewed by at least two peripheral cameras 210. The threshold distance varies throughout the local area, depending on the size of $\theta_1$. For example, an object 242 is at a first distance from the center point 218 and can be viewed by three peripheral cameras 210a, 210b, and 210c; however, an object 244 is located at a second distance that is less than the first distance and is within the field of view of both the peripheral camera 210a and the peripheral camera 210b. The peripheral cameras 210 and the axis cameras are positioned such that every object in the environment past a threshold distance can be viewed by at least two peripheral cameras 210. This configuration allows the camera assembly 200 to view objects in the local area from multiple angles and to capture image information with significant overlap, enabling the system 100 to reconstruct high quality 3D-360 degree content and/or video.

FIG. 2C illustrates a side view of the camera assembly 200 shown in FIG. 2, according to an embodiment. As described with regards to the embodiment of FIG. 2A, the lens 234 is a fisheye lens that has a wide angle $\theta_3$ field of view. In the embodiment of FIG. 2C, the angle $\theta_3$ is 185 degrees, which can vary in other embodiments. The lenses 234 are configured to have wide coverage of the top and bottom areas of an environment and provide sufficient overlap with the fields of view of the peripheral cameras 210, such that a high quality 3D-360 degree content can be created. In some embodiments, a surface 248 can be a support structure for the camera assembly 200 to rest on a table or to couple to a camera mount or stand.

Figure 2D:
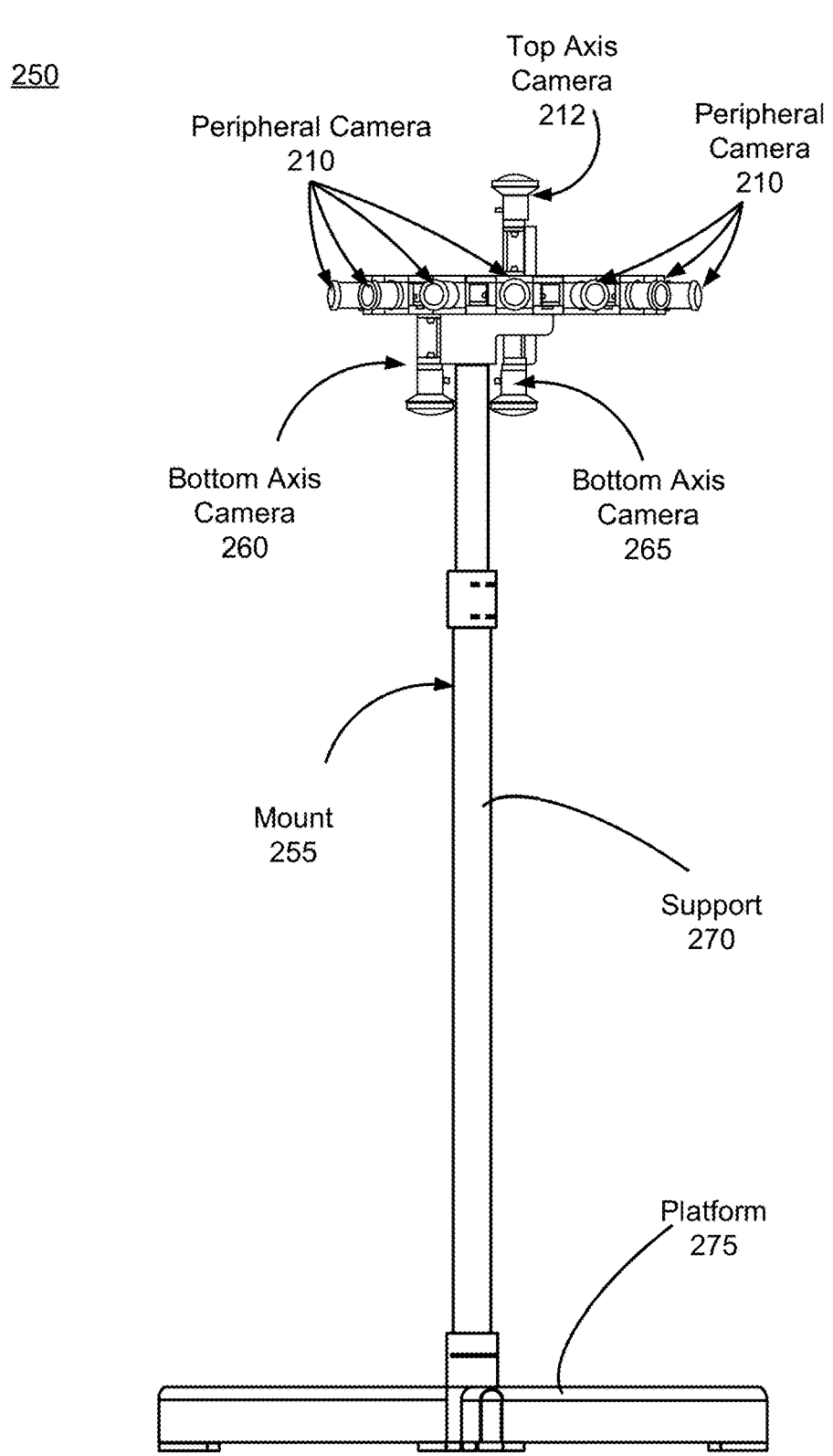
FIG. 2D illustrates a side view of a camera assembly for capturing image information, according to one embodiment.

FIG. 2D illustrates a side view of a camera assembly 250 for capturing image information, according to one embodiment. In some embodiments, the camera assembly 250 is an embodiment of the camera assembly 130 in system 100. Alternatively, the camera assembly 250 may be part of some other system. Some embodiments of the camera assembly 250 have different components than those described here. Similarly, in some cases, functions can be distributed among the components in a different manner than is described here.

The camera assembly 250 is substantially the same as the camera assembly 200, except that the camera assembly 250 includes a mount 255 and two bottom axis cameras 260, 265. The mount 255 supports the camera assembly 250. The mount 255 includes a support 270 and a platform 275. The support 270 transfer the load of the camera assembly 250 to the platform 275 in a stable manner (i.e., minimal vibration). In this embodiment, the support 270 is a single rod that couples the platform 275 to the camera assembly 250. In other embodiments, the support 270 may include a plurality of rods, or other means of support from the platform 275 to the camera assembly 250. The support 275 may be composed of, e.g., wood, metal, plastic, etc.

The platform 275 is a stable foundation for the support 270 and the camera system 250. In this embodiment, the platform 275 is simply three legs spaced apart from each other. The support 275 may be composed of, e.g., wood, metal, plastic, etc. Note, in alternate embodiments, other mounts may be used.

The bottom axis cameras 255, 260 are substantially the same as the bottom axis camera 214. The bottom axis cameras 255, 260 are arranged such that a field of view of the bottom axis camera 255 and a field of view of the bottom axis camera 260 have sufficient overlap to remove some or all of the mount 265 (e.g., portions of the support 270) as an occlusion in the 3D-360 degree content.

Figure 3:
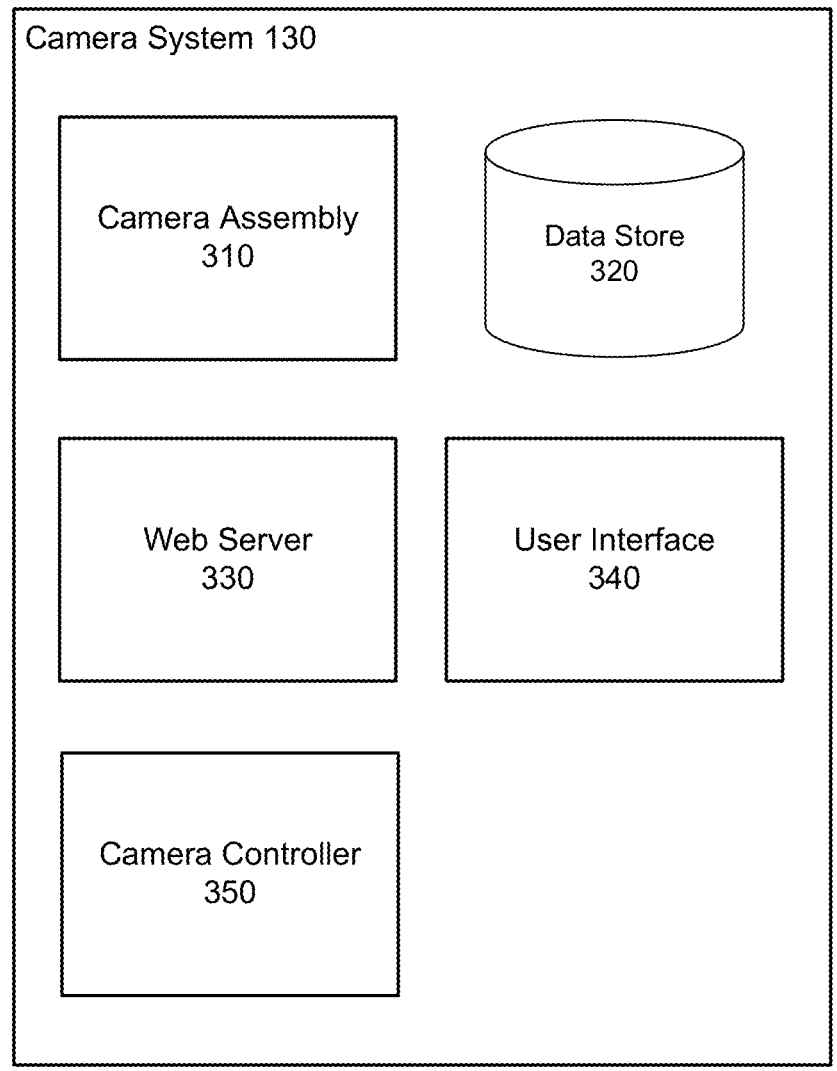
FIG. 3 is a high-level block diagram illustrating a detailed view of modules within a camera system, according to an embodiment.

FIG. 3 is a high-level block diagram illustrating a detailed view of modules within the camera system 130, according to an embodiment. Some embodiments of the camera system 130 have different modules than those described here. Similarly, the functions can be distributed among the modules in a different manner than is described here. The camera system 130 is comprised of modules including a camera assembly 310, a data store 320, a web server 330, a user interface 340, and a camera controller 350.

The camera assembly 310 captures image information using a plurality of cameras that are positioned to view 360 degrees of a local area. In some embodiments, the camera assembly 310 is an embodiment of the camera assembly 200. Alternatively, the camera assembly 310 may be some other camera assembly configured to capture a plurality of images that cover 360 degrees and at least a portion of which is captured in stereo. For example, the camera assembly 310 may be similar to the camera assembly 200 expect not include a bottom axis camera 214. The image information may include, e.g., one or more images, audio information, video information, metadata, or some combination thereof. The image information can be captured in various file formats for images (e.g. .jpeg, .tif, .png, etc.), audio (e.g. .aac, .mp3, .wav, etc.), and/or video (e.g. .mpg, .mov, .wmv, etc.). The camera assembly 310 captures the image information responsive to instructions from the camera controller 350. In some embodiments, the camera assembly 310 ensures that the image information captured from each peripheral camera 210 and axis cameras is consistent and allows for the construction of uniform, natural-looking 3D-360 degree content. The camera assembly 310 captures and sends some or all of the image information to, e.g., the user interface 340, the data store 320, the processing server 130, the data store 120, or some combination thereof.

The data store 320 of the camera system 130 is a local memory storage that stores image information. The data store 320 receives and stores the image information from the camera assembly 310. In some embodiments, the data store 320 may upload image information to, e.g., an external data store (e.g., data store 120), a processing server (e.g., processing server 130), or some combination thereof. In some embodiments, the data store 320 acts as a buffer. For example, the camera system 130 may generate image information at a rate that exceeds an upload rate to an external data store and/or a processing server. Accordingly, the data store 320 may temporarily buffer the image information to ensure that the upload rate does not exceed to the external data store and/or a processing server. In the some embodiments, the data store 320 may include multiple memories, and the image information may be written to in a distributed fashion across the multiple memories. For example, in some embodiments, the data store 320 may be in a RAID 5 configuration that includes block-level striping with distributed parity. This would allow large amounts of data to be written in a continuous manner. For example, at 30 Hz the camera assembly 310 may produce approximately 17 Gb/s at a sustained transfer rate. The data store 320 can receive and store the large amounts image information at a sustained rate.

In some embodiments, the data store 320 is configured to function, at least in part, as a circular buffer. The circular buffer is an area of memory in the data store 320 that includes multiple buffer elements (i.e., memory locations) used to temporarily store the image information (e.g., RAW data) captured from the camera assembly 310. The circular buffer allows the buffer elements to be filled and emptied at the same time for transmitting large datasets efficiently. Typically, the circular buffer has a head pointer and a tail pointer. The head pointer is used for a producer writing image information into the buffer elements. The tail pointer is used for a consumer reading the image information in the buffer elements.

In some embodiments, the image information captured by the camera assembly 310 includes a plurality of frames (e.g., in the order of thousands). The size of circular buffer is much larger than the total number of frames captured at a given time by the camera assembly 310. For example, the circular buffer may have a 1000 or more individual buffer elements. Once the head pointer points at a first buffer element of the circular buffer, the producer writes image information associated with one of the cameras in the camera assembly 310 into the first buffer element of the circular buffer. Then, the head pointer moves to a second buffer element of the circular buffer, and the producer writes image information associated with another camera in the camera assembly 310 into the second buffer element of the circular buffer, and so forth. For example, if the camera assembly 310 includes a total of 16 cameras, each trigger of the camera assembly 310 produces 16 images, and the 16 images are written to the corresponding 16 respective buffer elements. The consumer reads the first frame at the first buffer element and transmits the first frame to the memory storage embedded in the data store 320 or to the external data store (e.g., the data store 120), and so forth. In some embodiments, the image information is sequentially stored in a binary file format. The image information may later be extracted from the binary file and converted, via the processing server 140, into color (or Black and White) 3D-360 degree content.

In some embodiments, the circular buffer has multiple producers and multiple consumers. Each producer and each consumer may have a separate thread and operate independently. For one example, one producer used for each camera. The producer for each camera works independently. For another example, different producers are used for different groupings of cameras in the camera assembly 310, e.g., one producer is used for a half portion of the camera assembly 310 and the other different producer is used for the other half portion of the camera assembly 310.

In some embodiments, multiple consumers are associated with different data storage devices (e.g., hard drives). The different data storage devices may operate independently from each other. In some embodiments, each data storage device is a separate consumer. This configuration allows data to continuously flow from the circular buffer to the plurality of different data storage devices. For example, in some embodiments, two different data storage devices (e.g., a first and second data storage device) are used. And while the first data storage device is writing image information from the circular buffer, the second data storage device is seeking data. The second data storage device then writes image information, and the first data storage device seeks data, and so on. The corresponding consumers switch back and forth from the two storage devices, which facilitates writing image information to the multiple data storage devices at a speed fast enough for continuous operation of the camera assembly 310 (i.e., image information may be extracted from the circular buffer before it is overwritten).

In some embodiments, consumers send frames to another location for other processing. For one example, a consumer sends a frame to the web server 330 for further processing.

For another example, a consumer sends a frame to the user interface 340 for previewing the frame.

The web server 330 serves as a network 105 interface of the camera system 130. The web server 330 transfers data from the camera assembly 310 through the network 105 to the user device 110, the processing server 140, some other entity, or some combination thereof. In some cases, the camera assembly 310 may transfer data to the web server 330 using a wired interface (e.g., USB). The data can be compressed or uncompressed.

The user interface 340 allows a user to interface with the camera system 130. In some embodiments, the user interface 340 is a graphical user interface (GUI). An example user interface is described in detail below with regard to FIG. 8. The user interface 340 allows a user to preview data captured by the camera assembly 310 and to control the settings of the camera assembly 310. In some embodiments, the user interface 340 may be accessed through a network connection on a mobile phone, tablet, PC, etc. or any other device that has a network connection. In alternate embodiments, the user interface 340 may include a display and one or more input/output devices (e.g., mouse keyboard) that are directly coupled to the camera assembly 310.

The camera controller 350 is configured to control the operation of the camera assembly 310. In the embodiment of FIG. 3, the camera assembly 310 is configured to have one camera act as a principal camera, and the additional cameras act as ancillary cameras. The principal camera is the camera in which the camera controller acts as the master of a plurality of other cameras. The ancillary camera is the camera in which the camera controller acts as the slave to the master camera. The principal camera may be any peripheral camera 210 or axis camera; in the embodiment of FIG. 3, the principal camera is the top axis camera 212 coupled to the top plate 202.

The camera controller 350 controls exposure settings for cameras in the camera assembly 310. The exposure of a camera determines how light or dark an image will appear when captured by a camera. The exposure setting may include, e.g., aperture size, shutter speed (also referred to as exposure time), gain, or some combination thereof. The aperture size controls the amount of light that reaches the sensor. The shutter speed is the length of time that the sensor is exposed to light. The gain is the sensitivity of the sensor to the light. In some embodiments, the camera controller 350 instructs the camera assembly 310 to determine exposure setting for each of the cameras in the camera assembly 310. The camera controller 350 determines a global exposure setting using the determined exposure settings, and provides the global exposure setting to all of the cameras in the camera assembly 310. A global exposure setting is a single exposure setting that is applied to all of the cameras in the camera assembly 310.

In some embodiments, the camera controller 350 determines the respective exposure settings of each camera received from the camera assembly 310 and determines extreme values (e.g., minimum and maximum values) of all the exposure settings. Based on the extreme values, the camera controller 350 determines a set of test exposure settings and instructs the camera assembly 310 to capture test images using the set of test exposure settings.

After receiving the test images captured using each test exposure setting from the camera assembly 310, the camera controller 350 determines a global exposure setting based on intensity distributions of the received test images captured using the test exposure settings. The intensity distribution is a relationship between the number of the pixels (also referred to as counts, frequency) and the light intensity (e.g., red, green, blue, etc.) detected at each of those pixels. In some embodiments, the intensity information can be represented by gray level values of the test images. The relationship can be represented by probability distribution (e.g., histogram), statistical parameters (e.g., mean, median, symmetry, skewness, or any suitable parameter representing the distribution relationship). For example, the camera controller 350 generates a single histogram by accumulating counts over full range of intensities (e.g., 0-255 gray level values for 8-bit grayscale image) using the test images taken with a single test exposure setting. And the camera controller 350 generates a different histogram using test images taken with a different test exposure setting.

The camera controller 350 selects a global exposure setting using test images and selection criteria. Selection criteria are a set of conditions that determine whether a test exposure setting should be selected as a global exposure setting. Selection criteria may include, e.g., flatness of a histogram within a range of values, a percentage of saturated pixels in the intensity distribution below a threshold number (e.g., less than 0.05% of a total of all pixel values of the camera system 310), a percentage of pixels in the intensity distribution that have shadow clipping (i.e., completely black), an image noise value less than a threshold value, a gain value less than a threshold value (e.g., 4 db), minimum gain value without saturation, or some combination thereof. The process for determining the global exposure setting for the camera assembly 310 is further explained in detail below with regard to FIGS. 4-6.

Without a global exposure setting, each camera in the camera assembly 310 may capture image information at different exposure settings, causing some images to appear lighter or darker than other images, causing some moving objects to appear blurred in some images but not other images, etc. This may create inconsistencies between individual images when the images are stitched together to construct the 3D-360 degree content. Uniform exposure assists in creating natural looking images and/or video in 3D-360 degree content. In alternate embodiments, the camera controller 350 instructs the principal camera to determine its exposure setting, and then sets the determined exposure setting as a global exposure setting and provides the global exposure setting to all of the cameras in the camera assembly 310. A global exposure setting provides for uniform exposure across all of the plurality of peripheral cameras 210 and axis cameras (e.g., top axis camera 212, bottom axis camera 214).

The camera controller 350 controls a global shutter of the camera assembly 310. A global shutter synchronizes the shutter of each camera in the camera assembly 310, such that each shutter opens at the same time (i.e. within less than 1 millisecond of one another), allowing the camera assembly 310 to capture synchronous image information. The global shutter allows each pixel in each camera in the camera assembly 310 to begin exposure simultaneously and end the exposure simultaneously. This prevents fast moving objects from smearing diagonally across a frame, which is something that can occur in a camera system that using a rolling shutter (i.e., shutter mode where different lines of a camera sensor are exposed at different times as the read out 'wave' sweeps through the camera sensor). The camera controller 350 may instruct a principal camera (e.g., the top axis camera 212) to provide a master trigger signal to the ancillary cameras in the camera assembly 310. The master trigger signal commands the shutter of each ancillary camera to open at the same time as the shutter of the principal camera. The peripheral cameras 210 and the axis cameras within the camera assembly 310 may be connected with generator locking cables (e.g. USB 3.0 generator locking cables) to ensure that data is captured synchronously. Capturing synchronous image information ensures that individual images match and can be accurately stitched together by the processing server 140 to construct the 3D-360 degree content.

Figure 4:
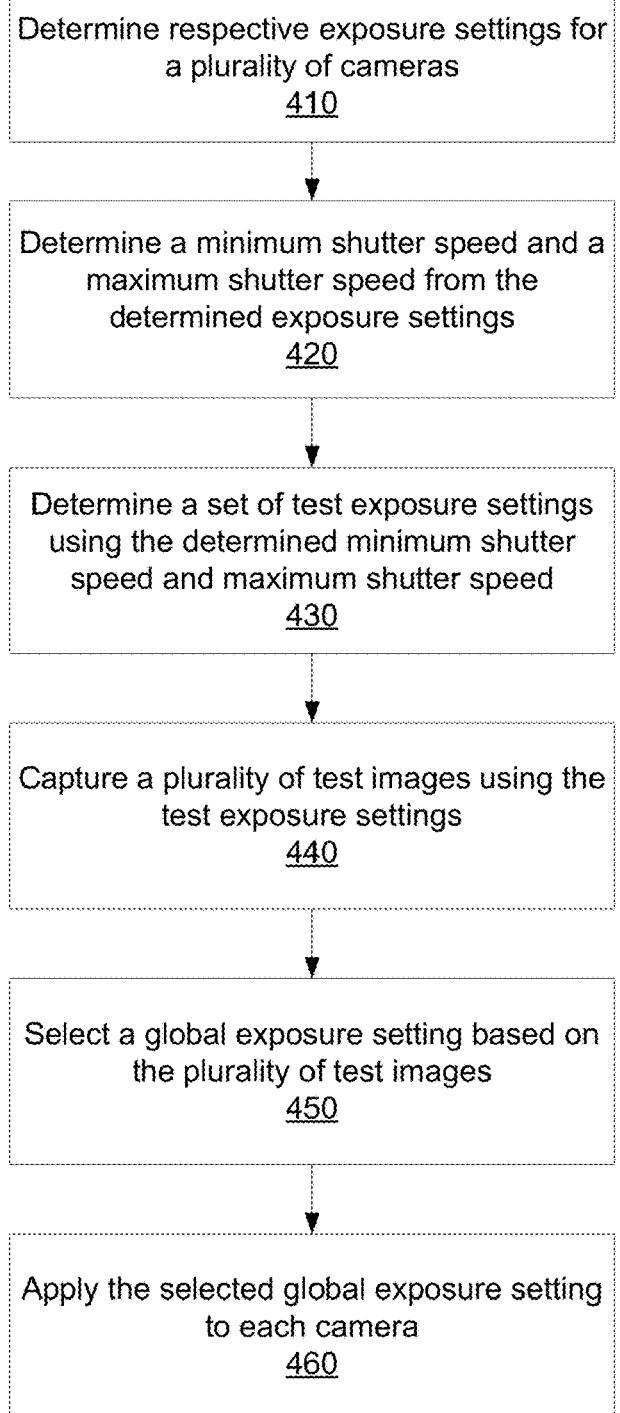
FIG. 4 is a flowchart of a process for determining a global exposure setting for a camera assembly, according to an embodiment.

FIG. 4 is a flowchart of a process 400 for determining a global exposure setting in a camera assembly, according to an embodiment. The camera assembly may be, e.g., the camera assembly 310. In other embodiments, the camera assembly may be some other camera assembly system that captures images that are stitched together to make an image with a larger field of view. The process 400 may be performed by the camera system 130 in some embodiments. Alternatively, other components may perform some or all of the steps of the process 400. Additionally, the process 400 may include different or additional steps than those described in conjunction with FIG. 4 in some embodiments or perform steps in different orders than the order described in conjunction with FIG. 4.

The camera system 130 determines 410 respective exposure settings for a plurality of cameras (e.g., some or all of the cameras that are included in the camera assembly 310). The camera system 130 instructs (e.g., via the camera controller 350) some or all of the cameras (peripheral and/or axis cameras) in the camera assembly 310 to determine their respective exposure settings. As each camera has a different field of view the exposure settings for the cameras may differ from one another. For example, a field of view of a top axis camera may include the sun (i.e., a bright source) and include a lot of light, whereas a field of view of a bottom axis camera (if present) may be the ground and include much less light.

As mentioned earlier, the exposure setting for each camera includes setting parameters that may include, e.g., aperture size, shutter speed, and gain. In some embodiments, one or more setting parameters are fixed. For example, the camera assembly 130 may fix aperture size and gain, and instruct some or all of the cameras to return respective shutter speeds that result in proper exposure.

The camera system 130 determines 420 a minimum shutter speed and a maximum shutter speed from the determined exposure settings. In some embodiments, the camera system 130 ranks the determined shutter speeds. For example, the camera system 130 may rank the determined shutter speeds from shortest time (minimum) to longest time (maximum). The camera system 130 selects the shutter speed at the bottom of the ranking as the minimum shutter speed and selects the shutter speed at the top of the ranking as the maximum shutter speed. In other embodiments, the camera system 130 ranks the determined shutter speeds from longest time to shortest time, and selects the shutter speed at the bottom of the ranking as the maximum shutter speed and selects the shutter speed at the top of the ranking as the minimum shutter speed.

The camera system 130 determines 430 a set of test exposure settings using the determined minimum shutter speed and maximum shutter speed. In some embodiments, based on the minimum and maximum shutter speeds, the camera system 130 determines a plurality of test shutter speeds. The test shutter speeds include the minimum shutter speed, the maximum shutter speed, and one or more shutter speeds distributed between the minimum and maximum shutter speeds. The one or more shutter speeds may be evenly or unevenly distributed between the minimum and maximum shutter speeds. In some embodiments, the camera assembly 130 generates a set of test exposure settings using the test shutter speeds. For example, the set of test exposure settings may include a test exposure setting for each of the test shutter speeds. In some embodiments, the other setting parameters (i.e., gain and aperture size) for each test exposure setting are fixed. An example of even distribution of test shutter speeds is discussed in detail below with regard to FIG. 5.

In some embodiments, the camera system 130 may be configured to capture video. For capturing video, the camera system 130 determines whether the maximum shutter speed is greater than or equal to a threshold time value. The threshold time value is a time value that is less than or equal to a time value corresponding to an inverse of a frame rate of video to be captured. For example, if the frame rate of the video is 30 frames per second, the threshold time value may be approximately 30 ms (or less). If the maximum shutter speed is less than or equal to the threshold time value, the camera system 130 determines, as discussed above, test shutter speeds.

However, if the maximum shutter speed is greater than the threshold time value, the camera system 130 fixes the shutter speed at the threshold time value and determines a plurality of test gain values, the plurality of test gain values range from a minimum gain value to a maximum gain value. The camera assembly 130 generates a set of test exposure settings using the test gain values. In some embodiments, the other setting parameters (i.e., shutter speed and aperture size) for each of the test exposure settings are fixed. An example of even distribution of gain values is discussed in detail below with regard to FIG. 6.

The camera system 130 captures 440 a plurality of test images using the test exposure settings. The plurality of captured images includes a plurality of sets of images captured at each test exposure setting. Each set of test images includes images from each of the cameras in the camera assembly 310 that are captured using the same test exposure setting and are captured at the same time (i.e., taken using a global shutter).

The camera system 130 selects 450 a global exposure setting based on the plurality of test images. The camera system 130 determines an intensity distribution associated with each group of the captured test images. The camera system 130 applies selection criteria (e.g., percentage of saturated pixels less than a threshold value) to one or more of the intensity distributions to identify which (if any) of the intensity distributions satisfy the selection criteria.

In some embodiments where the shutter speed is different in each test exposure setting (e.g., 1 ms, 4 ms, 6 ms, and 10 ms), the camera system 130 applies the selection criteria to the intensity distribution associated with a largest exposure value (i.e., maximum shutter speed). If the selection criteria are met, the camera system 130 selects the test exposure setting associated with the intensity distribution as a global exposure setting. If the selection criteria are not met, the camera system 130 applies the selection criteria to an intensity distribution having a next highest exposure value (i.e., next longest shutter speed), and again determines whether or not the selection criteria are met, and so on. The process repeats until the selection criteria are met for a particular intensity distribution.

In some embodiments where the gain is different in each test exposure setting (e.g., 0 dB, 1 dB, 2 dB, 3 dB, etc.), the camera system 130 applies the selection criteria to the intensity distribution associated with a minimum exposure value (i.e., lowest gain value). If the selection criteria are met, the camera system 130 selects the test exposure setting associated with the intensity distribution as a global exposure setting. If the selection criteria are not met, the camera system 130 applies the selection criteria to an intensity distribution having a next lowest exposure value (i.e., second to lowest gain value), and determines whether or not the selection criteria are met, and so on, until the selection criteria are met. As image quality generally degrades with gain, at some point increasing gain may result in images that are below a quality threshold. Accordingly, in some embodiments, if the selection criteria are not met by any of the intensity distributions the camera system 130 may return an error message to a user (e.g., too much noise in image, not enough light, etc.).

The camera system 130 applies 460 the selected global exposure setting to each camera (i.e., each camera in the camera assembly 310). In one embodiment, the camera system 130 applies the selected global exposure setting to all the cameras in the camera assembly 310 directly. In another embodiment, the camera system 130 applies the selected global exposure setting to each camera via a principal camera in the camera assembly 310.

Figure 5:
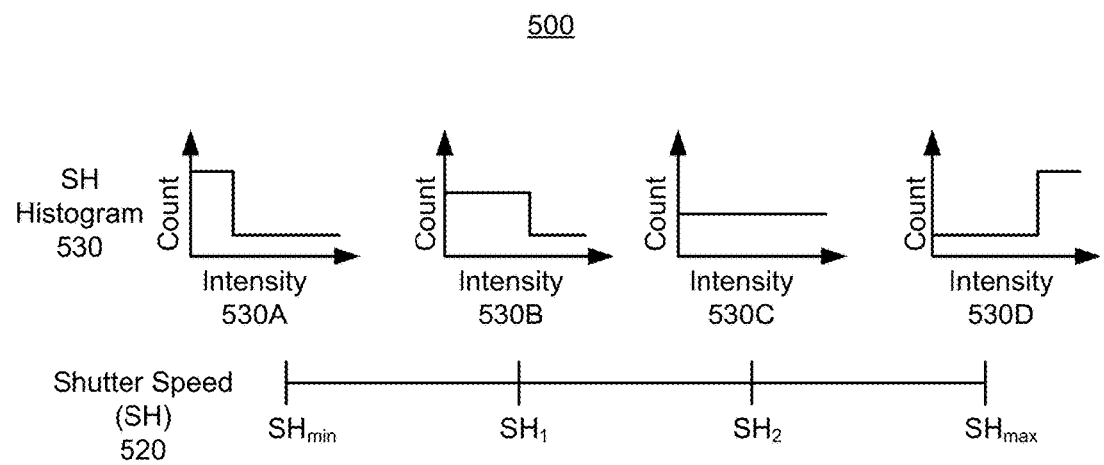
FIG. 5 illustrates a group of intensity distributions for different test exposure settings, according to an embodiment.

FIG. 5 illustrates a group 500 of intensity distributions for different test exposure settings, according to an embodiment. As shown in FIG. 5, the set of test exposure settings include four different shutter speeds (SH) 520, which include a minimum shutter speed ($SH_{min}$), a first intermediate shutter speed ($SH_1$), a second intermediate shutter speed ($SH_2$), and maximum shutter speed ($SH_{max}$). The shutter speeds are related to each other via the following relationship $SH_{min}<SH_1<SH_2<SH_{max}$. Each test exposure setting has one shutter speed.

The camera system 130 (e.g., via the camera controller 350) instructs the camera assembly 310 to capture a set of test images at each of the test exposure settings. In this example, the test exposure settings have the same gain and aperture values, but different respective shutter speeds. The camera system 130 (e.g., via the camera controller 350) generates intensity distributions for each set of test images. The distributions are shown in FIG. 5 as histograms 530. The histograms 530 change from skewed-left to skewed-right while the shutter speeds changing from the $SH_{min}$ to the $SH_{max}$. More skewed to right of the intensity distribution in the histogram indicates more bright pixels in the group of the test images, and more skewed to left intensity distribution in the histogram indicates more dark pixels in the group of test images.

As discussed above with reference to FIG. 4, the camera system 130 applies selection criteria to the intensity distribution having a largest exposure value first, and then applies the selection criteria to the intensity distribution having the next largest exposure value, and so on, until the selection criteria are met. In FIG. 5, histogram 530D has the highest exposure value, but would fail the selection criteria because, for example, it has too large a number of pixels that are saturated. The camera system 130 would then apply the selection criteria to the intensity distribution associated with histogram 530C. The flat distribution of the histogram 530C indicates uniform brightness, and would meet the selection criteria. Thus, the camera system 130 selects a test exposure setting including $SH_2$ as a global exposure setting.

Figure 6:
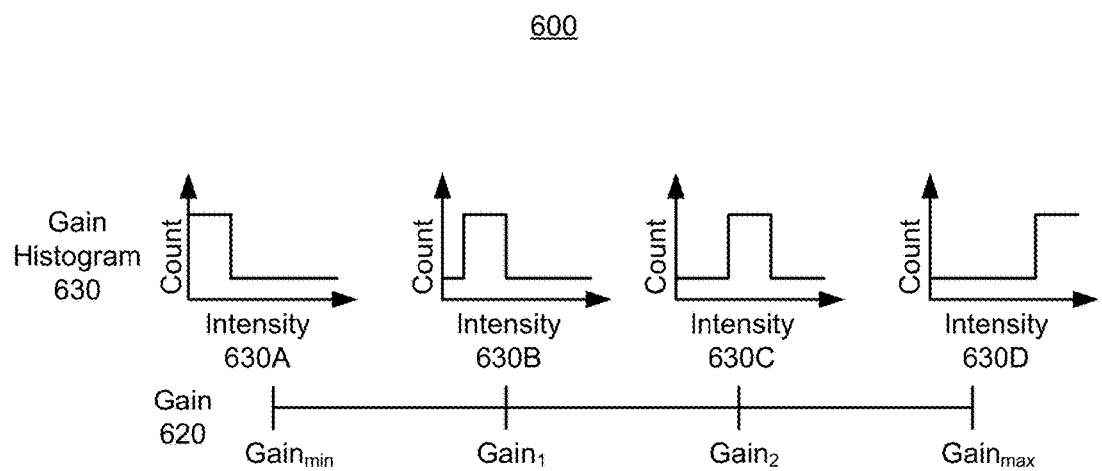
FIG. 6 illustrates another group of intensity distributions for different test exposure settings, according to an embodiment.

FIG. 6 illustrates another group 600 of intensity distributions for different test exposure settings, according to an embodiment. As shown in FIG. 6, the test exposure settings use four different gain values 620, which are the minimum gain value ($Gain_{min}$), a first intermediate gain value ($Gain_1$), a second intermediate gain value ($Gain_2$), and a maximum gain value ($Gain_{max}$). The gain values are related to each other via the following relationship $Gain_{min}<Gain_1<Gain_2<Gain_{max}$. Similar to FIG. 5, as intensity distributions skew to right in a histogram the number of bright pixels increases, and as intensity distributions skew to left in a histogram the number of dark pixels increases. Note that noise in the image increases with increasing gain.

As discussed above with reference to FIG. 4, the camera system 130 applies selection criteria to the intensity distribution having a lowest exposure value first, and then applies the selection criteria to the intensity distribution having the next lowest exposure value, and so on, until the selection criteria are met. In FIG. 6, histogram 630C shows a distribution that is not clipped (e.g., saturated either in dark or light pixels) and has moderate noise. Thus, the test exposure setting including $Gain_2$ would be selected as a global exposure setting.

Figure 7:
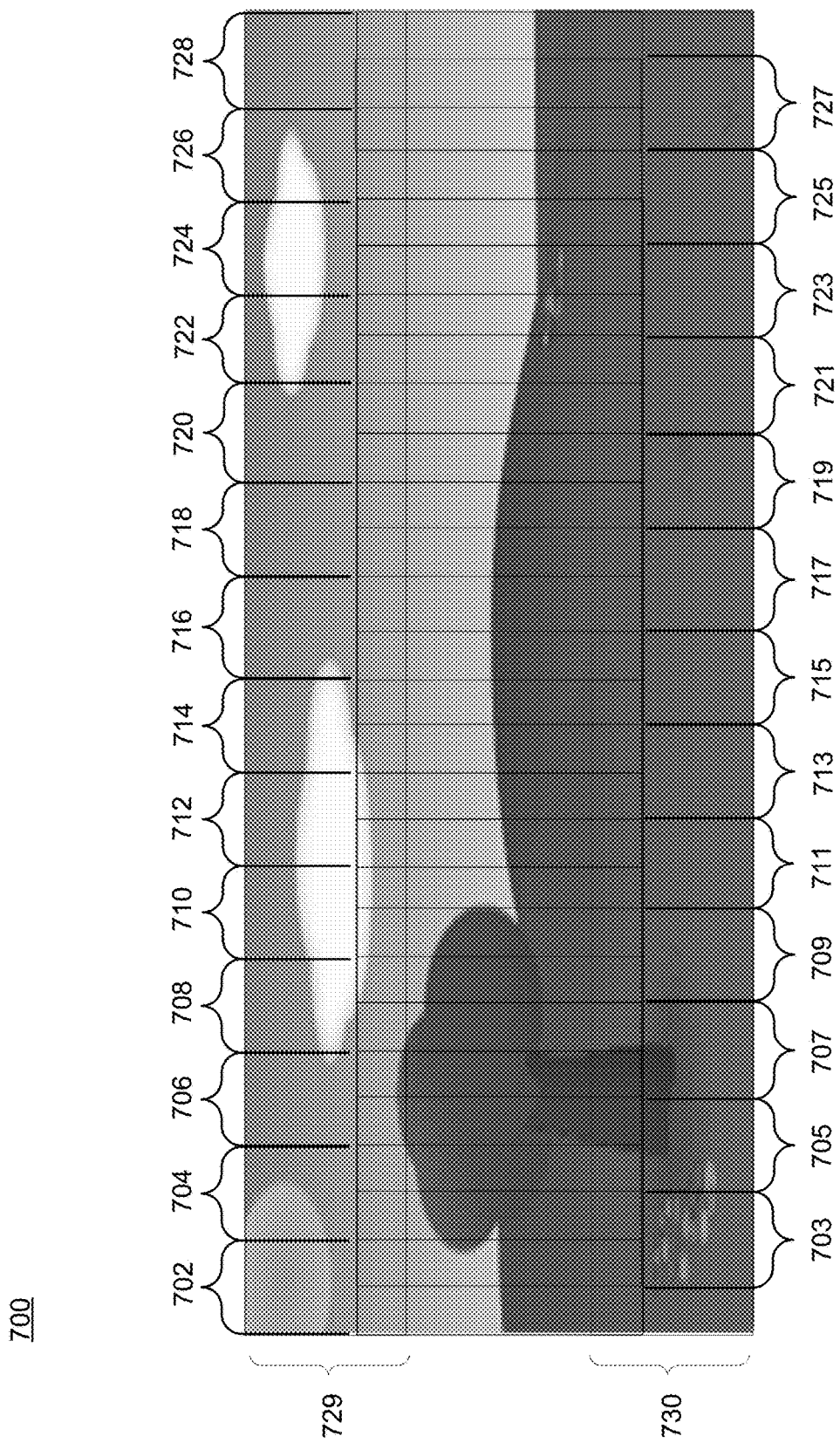
FIG. 7 illustrates 3D-360 degree content generated from image information, according to an embodiment.

FIG. 7 illustrates 3D-360 degree content generated from image information, according to one embodiment. In the embodiment of FIG. 7, the 3D-360 degree content is a constructed image 700 that was generated using individual image frames 702-730. The individual image frames 702-730 were processed by the processing server 140 and constructed to form a 360 degree image that is in 3D for portions of the image generated from frames 702-730.

The frames 702-728 were captured by the plurality of peripheral cameras 210, wherein an individual frame is captured by one peripheral camera 210. Each frame 702-728 includes a two-dimensional (2D) portion of the local area. Combining images that capture a local area from multiple 2D perspectives into a single image allow the objects within the image to appear 3D. When individual frames captured by a camera assembly with a 360 degree view of a local area, such as frames 702-728, are combined, it results in the constructed image 700 that illustrates a 3D-360 degree view of the local area. Each frame 702-730 includes a region where it overlaps with respective adjacent frames, as illustrated in FIG. 7. The overlapping regions of the frames 702-728 result from the overlap of the fields of view of the peripheral cameras 210, as described with regards to FIG. 2B. The overlapping regions allow the processing server 140 to seamlessly and accurately construct the frames 702-728 into a 360 degree image for a virtual reality system.

Similarly, the frames 729 and 730 are captured by the plurality of axis cameras, wherein an individual frame is captured by one axis camera. In the embodiment of FIG. 7, frame 729 is captured by the top axis camera 212, and frame 730 is captured by the bottom axis camera 214. Each frame 729 and 730 includes a region where it overlaps with the frames 702-728 captured by the peripheral cameras 210, providing the top and bottom views of the local area. The overlapping regions of the frames 729 and 730 result from the overlap of the fields of view of the axis cameras with the peripheral cameras 210. The overlapping regions allow the processing server 140 to seamlessly and accurately combine the frames 729 and 730 with the frames 702-728 into a 360 degree image for a virtual reality system.

Furthermore, in the embodiment of FIG. 7, each frame 702-730 includes metadata that allows the processing server 140 to create the constructed image 700 from the individual frames 702-730. As described with regards to FIG. 1, metadata may include, e.g., frame rate, exposure setting (e.g., shutter speed, gain, etc.), copyright information, date/time information, camera identifier, names, labeling, some other information associated with the image information, or some combination thereof. For example, in one embodiment, to create the constructed image 700, the processing server 140 may use the date/time information for each frame to verify that the appropriate frames are combined. In another embodiment, the processing server 140 may use the camera identifier information to ensure that the frames are combined in the correct sequence. The metadata included with each frame 702-728 ensures that individual frames are combined correctly to create a 360 degree image for a virtual reality system.

Figure 8:
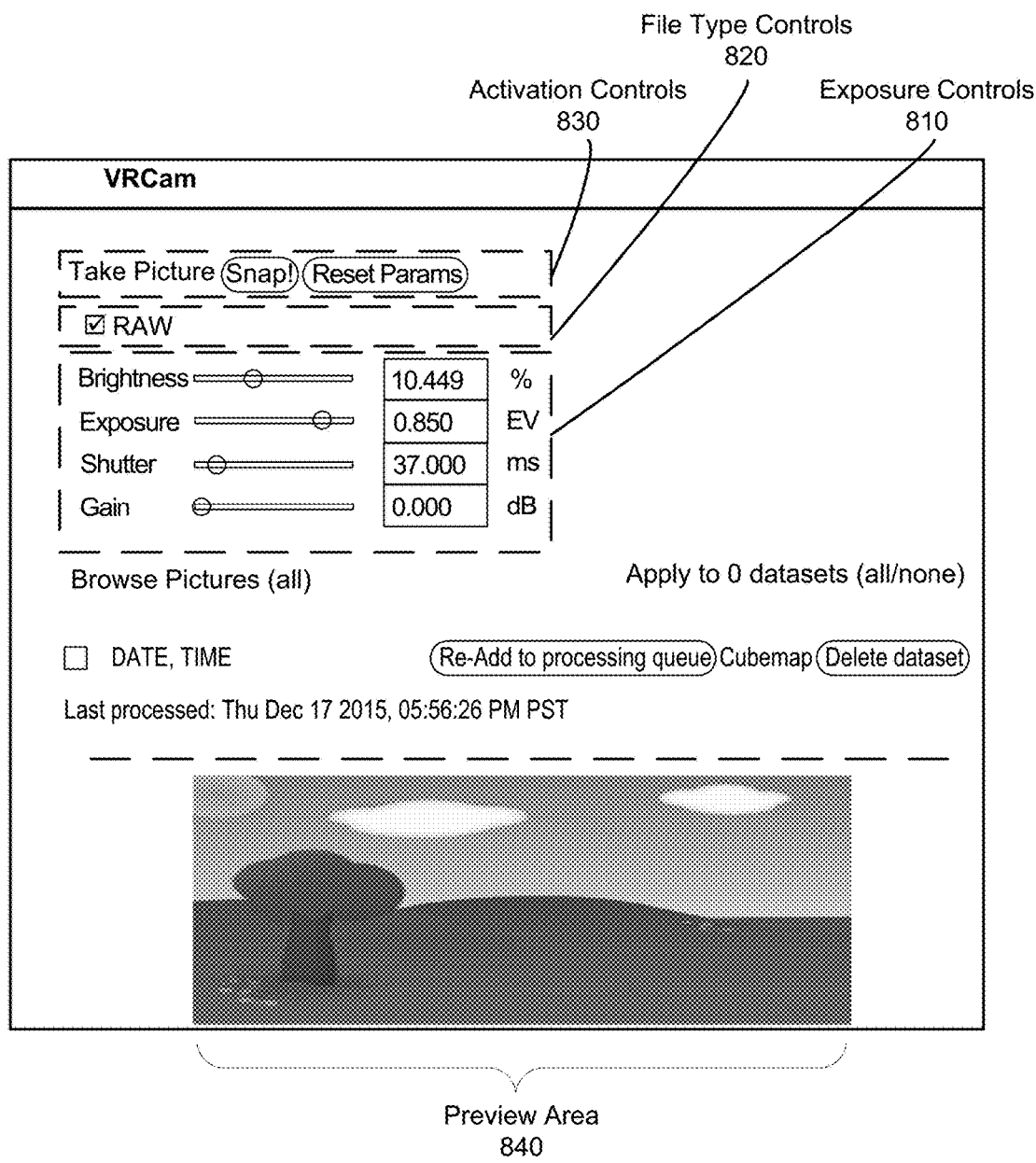
FIG. 8 illustrates a user interface for a camera system, according to an embodiment.

FIG. 8 illustrates a user interface 800 for the camera system 130, according to one embodiment. The user interface 800 may be, e.g., the user interface 340. The user interface 800 allows a user to control the camera system 130. The user interface 800 includes exposure controls 810, file type controls 820, activation controls 830, and a preview area 840.

The exposure controls 810 allow a user to control and adjust the global exposure setting of the camera assembly 310. The exposure controls 810 may include brightness, aperture, shutter, and gain settings. The global exposure setting is determined from all of the cameras in the camera assembly 310 by the process described in FIG. 4. In some embodiments, the global exposure setting may be determined from a principal camera in the camera assembly 310. The determined settings may serve as initial settings, from which the user can adjust using the exposure controls 810. Once the exposure controls 810 have been adjusted to the desired settings, the desired settings can be provided to each camera in the camera assembly 310.

The file type controls 820 allow a user to control the format in which image information is captured. The file type controls 820 may include various file types for images (e.g. .jpeg, .tif, .png, etc.), audio (e.g. .aac, .mp3, .wav, etc.), and/or video (e.g. .mpg, .mov, .wmv, etc.). Some embodiments may allow a user to control the file type for each individual type of image information.

The activation controls 830 allow a user to control the operation of the camera assembly 310. The activation controls 830 may include, but are not limited to, options to power the camera assembly 310 on and off, to activate the camera assembly 310 to capture image information, to reset the settings of the camera assembly 310, to activate the processing server 140 to start or stop processing the captured image information, among other functionalities for the camera system 130.

The preview area 840 allows a user to preview an image constructed from the image information captured by the cameras of the camera assembly 310. The preview area 840 assists the user in determining desired exposure setting of the camera assembly 310 and/or desired positioning of the camera assembly 310 within the local area. The preview area 840 ensures that the camera assembly 310 is capturing image information to construct desired 3D-360 degree content for a virtual reality system.

In some embodiments, the user interface 340 also allows a user to control the processing server 140, access the data store 120, and access the data store 320. In the embodiment of FIG. 8, the user interface 340 includes settings (e.g. brightness, exposure value defined by the aperture and shutter speed, shutter, and gain), an image preview, and metadata associated with the image preview. The settings may be modified by the user, and the settings are sent to the camera controller 350, which commands the camera assembly 310 and implements the camera settings globally onto the peripheral cameras 210 and axis cameras. The user interface 340 may be accessed on any device that has a network connection to the network 105.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   determining respective exposure settings for each camera of a plurality of cameras, each camera having a respective field of view of a portion of a local area, and the plurality of cameras having a combined field of view spanning 360 degrees of the local area;

determining a minimum shutter speed and a maximum shutter speed for each camera of the plurality of cameras from the determined exposure settings;

for each camera, determining a set of test exposure settings using the determined minimum shutter speed and maximum shutter speed of the camera;

capturing a set of test images using the plurality of cameras at each test exposure setting in the set of test exposure settings, wherein each set of test images includes an image from each camera of the plurality of cameras that are captured using a same respective test exposure setting and are captured at a same time;

selecting a global exposure setting based on the captured sets of test images; and applying the selected global exposure setting to the plurality of cameras.

2. The method of claim 1, wherein determining the set of test exposure settings using the determined minimum shutter speed and maximum shutter speed of the camera comprises:

determining one or more test shutter speeds distributed between the minimum shutter speed and the maximum shutter speed of the camera; and generating a respective test exposure setting for the minimum shutter speed, the one or more test shutter speeds, and the maximum shutter speed.

3. The method of claim 2, wherein the one or more test shutter speeds are evenly distributed between the minimum shutter speed and the maximum shutter speed of the camera.

4. The method of claim 1, wherein determining the set of test exposure settings using the determined minimum shutter speed and maximum shutter speed of the camera further comprises:

comparing the maximum shutter speed with a threshold time value; and responsive to determining that the maximum shutter speed is less than or equal to the threshold time value; determining one or more test shutter speeds distributed between the minimum shutter speed and the maximum shutter speed of the camera; and generating a respective test exposure setting for the minimum shutter speed, the one or more test shutter speeds, and the maximum shutter speed.

5. The method of claim 1, wherein determining the set of test exposure settings using the determined minimum shutter speed and maximum shutter speed of the camera further comprises:

comparing the maximum shutter speed of the camera with a threshold time value; and responsive to determining that the maximum shutter speed is greater than the threshold time value; determining a plurality of test gain values; and generating a respective test exposure setting for the plurality of test gain values, wherein the shutter speed and the aperture are the same for each of the test exposure settings.

6. The method of claim 5, wherein the threshold time value is a time period corresponding to an inverse of a frame rate of a video captured by the plurality of cameras.

7. The method of claim 5, wherein the shutter speed for each of the test exposure settings is the threshold time value.

8. The method of claim 1, wherein selecting a global exposure setting based on the captured sets of test images comprises:

determining intensity distributions using the sets of captured test images;

applying selection criteria to one or more of the intensity distributions; and selecting a test exposure setting as a global exposure setting based in part on an intensity distribution associated with the test exposure setting satisfying the selection criteria.

9. The method of claim 8, wherein the selection criteria are selected from a group consisting of: flatness of a histogram within a range of values, a percentage of saturated pixels in the intensity distribution below a threshold number, a percentage of pixels in the intensity distribution that have shadow clipping, an image noise value less than a threshold value, a gain value less than a threshold value, and a minimum gain value without saturation.

10. A method comprising:

determining respective exposure settings for each camera of a plurality of cameras, each camera having a respective field of view of a portion of a local area, and the plurality of cameras having a combined field of view spanning 360 degrees of the local area;

determining a minimum shutter speed and a maximum shutter speed for each camera of the plurality of cameras from the determined exposure settings;

for each camera, determining a set of test exposure settings using the determined minimum shutter speed and maximum shutter speed of the camera;

capturing a set of test images using the plurality of cameras at each test exposure setting in the set of test exposure settings, wherein each set of test images includes an image from each camera of the plurality of cameras that are captured using a same respective test exposure setting and are captured at a same time;

selecting a global exposure setting based on the captured sets of test images; and applying the selected global exposure setting to the plurality of cameras.

11. The method of claim 10, wherein determining the set of test exposure settings using the determined minimum shutter speed and maximum shutter speed of the camera comprises:

determining one or more test shutter speeds distributed between the minimum shutter speed and the maximum shutter speed of the camera; and generating a respective test exposure setting for the minimum shutter speed, the one or more test shutter speeds, and the maximum shutter speed.

12. The method of claim 11, wherein the one or more test shutter speeds are evenly distributed between the minimum shutter speed and the maximum shutter speed of the camera.

13. The method of claim 10, wherein determining the set of test exposure settings using the determined minimum shutter speed and maximum shutter speed of the camera further comprises:

comparing the maximum shutter speed with a threshold time value; and responsive to determining that the maximum shutter speed is less than or equal to the threshold time value; determining one or more test shutter speeds distributed between the minimum shutter speed and the maximum shutter speed of the camera; and generating a respective test exposure setting for the minimum shutter speed, the one or more test shutter speeds, and the maximum shutter speed.

14. The method of claim 10, wherein determining the set of test exposure settings using the determined minimum shutter speed and maximum shutter speed of the camera further comprises:

comparing the maximum shutter speed of the camera with a threshold time value; and responsive to determining that the maximum shutter speed is greater than the threshold time value;

determining a plurality of test gain values; and generating a respective test exposure setting for the plurality of test gain values, wherein the shutter speed and the aperture are the same for each of the test exposure settings.

15. The method of claim 14, wherein the threshold time value is a time period corresponding to an inverse of a frame rate of a video captured by the plurality of cameras.

16. The method of claim 14, wherein the shutter speed for each of the test exposure settings is the threshold time value.

17. The method of claim 10, wherein selecting a global exposure setting based on the captured sets of test images comprises:

determining intensity distributions using the sets of captured test images;

applying selection criteria to one or more of the intensity distributions; and selecting a test exposure setting as a global exposure setting based in part on an intensity distribution associated with the test exposure setting satisfying the selection criteria.

18. The method of claim 17, wherein the selection criteria are selected from a group consisting of: flatness of a histogram within a range of values, a percentage of saturated pixels in the intensity distribution below a threshold number, a percentage of pixels in the intensity distribution that have shadow clipping, an image noise value less than a threshold value, a gain value less than a threshold value, and a minimum gain value without saturation.

19. A method comprising:

determining respective exposure settings for each camera of a plurality of cameras, each camera having a respective field of view of a portion of a local area, and the plurality of cameras having a combined field of view spanning 360 degrees of the local area, wherein any object in the portion of the local area more than a threshold distance from the plurality of cameras is within a field of view of at least two cameras of the plurality of cameras;

determining a minimum shutter speed and a maximum shutter speed for each camera of the plurality of cameras from the determined exposure settings;

for each camera, determining a set of test exposure settings using the determined minimum shutter speed and maximum shutter speed of the camera;

capturing a set of test images using the plurality of cameras at each test exposure setting in the set of test exposure settings, wherein each set of test images includes an image from each camera of the plurality of cameras that are captured using a same respective test exposure setting and are captured at a same time;

selecting a global exposure setting based on the captured sets of test images; and applying the selected global exposure setting to the plurality of cameras.

20. The method of claim 19, wherein determining the set of test exposure settings using the determined minimum shutter speed and maximum shutter speed of the camera comprises:

determining one or more test shutter speeds distributed between the minimum shutter speed and the maximum shutter speed of the camera; and generating a respective test exposure setting for the minimum shutter speed, the one or more test shutter speeds, and the maximum shutter speed.

* * * * *